United States Patent
Chen et al.

(10) Patent No.: US 9,546,113 B2
(45) Date of Patent: *Jan. 17, 2017

(54) HIGH POROSITY/LOW PERMEABILITY GRAPHITE BODIES AND PROCESS FOR THE PRODUCTION THEREOF

(75) Inventors: Chong Chen, Broadview Heights, OH (US); Philip D. Coleman, Avon, OH (US); Charles Irsak, Olmsted Falls, OH (US); Greg E. Murray, Parma, OH (US); James Joseph Pavlisin, Cleveland, OH (US); Paul Stephen Sirocky, Brook Park, OH (US)

(73) Assignee: GrafTech INternational Holding Inc., Brooklyn Heights, OH (US)

( * ) Notice: Subject to any disclaimer, the term of this patent is extended or adjusted under 35 U.S.C. 154(b) by 985 days.

This patent is subject to a terminal disclaimer.

(21) Appl. No.: 13/588,046

(22) Filed: Aug. 17, 2012

(65) Prior Publication Data

US 2012/0308472 A1 Dec. 6, 2012

Related U.S. Application Data

(62) Division of application No. 12/633,196, filed on Dec. 8, 2009, now Pat. No. 8,721,939.

(51) Int. Cl.
| | |
|---|---|
| *C01B 31/00* | (2006.01) |
| *C04B 35/532* | (2006.01) |
| *C04B 35/536* | (2006.01) |

(52) U.S. Cl.
CPC .......... *C04B 35/532* (2013.01); *C04B 35/536* (2013.01); *C04B 2235/5427* (2013.01); *C04B 2235/5436* (2013.01); *C04B 2235/5463* (2013.01); *C04B 2235/608* (2013.01); *C04B 2235/77* (2013.01); *Y10T 428/249967* (2015.04)

(58) Field of Classification Search
CPC .......... H01B 1/04; H01M 4/00; Y10S 403/05; F16D 69/023; C04B 35/536; C04B 2235/77; C04B 2235/5436; C04B 2235/608; C04B 2235/5427; C04B 2235/5463; Y10T 428/249967
USPC ........................................................ 423/448
See application file for complete search history.

(56) References Cited

U.S. PATENT DOCUMENTS

| | | |
|---|---|---|
| 2,789,038 A | 4/1957 | Bennett |
| 3,001,237 A | 9/1961 | Rodriguez |
| 3,092,437 A | 6/1963 | Carter et al. |
| 3,102,047 A | 8/1963 | Rivington |
| 3,201,330 A | 8/1965 | Thomas |
| 3,246,056 A | 4/1966 | Shea |
| 3,280,231 A | 10/1966 | Cornuault |
| 3,284,372 A | 11/1966 | Bailey |
| 3,517,092 A | 6/1970 | Peterson |

(Continued)

FOREIGN PATENT DOCUMENTS

GB 1219714 1/1971

*Primary Examiner* — Robert J Grun
(74) *Attorney, Agent, or Firm* — Patrick D. Floyd (57) ABSTRACT

A method of forming a graphitic carbon body employs compression and resistance heating of a stock blend of a carbon material and a binder material. During molding of the body, resistance heating is accompanied by application of mechanical pressure to increase the density and carbonization of the resulting preform body. The preform can then be subjected to a graphitization temperature to form a graphite article.

9 Claims, 4 Drawing Sheets

(56) References Cited

U.S. PATENT DOCUMENTS

| | | |
|---|---|---|
| 3,628,984 A * | 12/1971 | Ishikawa et al. ............ 427/228 |
| 4,198,382 A | 4/1980 | Matsui |
| 4,847,021 A | 7/1989 | Montgomery et al. |
| 5,776,372 A | 7/1998 | Saito et al. |
| 2003/0111752 A1 | 6/2003 | Wood et al. |
| 2006/0202393 A1 | 9/2006 | Kortovich et al. |

* cited by examiner

HIGH POROSITY/LOW PERMEABILITY GRAPHITE BODIES AND PROCESS FOR THE PRODUCTION THEREOF

RELATED APPLICATION

This application is a divisional of U.S. Ser. No. 12/633,196, filed Dec. 8, 2009 now U.S. Pat. No. 8,721,939 and entitled "High Porosity/Low Permeability Graphite Bodies And Process For The Production Thereof", the disclosure of which is incorporated herein in its entirety.

TECHNICAL FIELD

The present disclosure relates generally to graphite bodies, such as graphite plates and other articles, having ultra-low permeability, and a process for forming such graphite bodies. In one embodiment, the disclosure concerns graphite bodies having a porosity of at least about 10% while exhibiting ultra-low permeability, that is, permeability of less than about 1.0 milli-darcys, as measured by ASTM C577.

BACKGROUND OF THE DISCLOSURE

Graphite bodies have potential for use in a variety of applications, including uses in nuclear reactors, electrochemical fuel cells, the production of silicon and polysilicon, and other applications where a non-reactive material like graphite is needed. One characteristic missing from conventional graphites, however, is the combination of high porosity and ultra-low permeability which permits impregnation of materials into the graphite but which prevents leakage across the graphite article. It is this unusual combination of characteristics which permits the graphite of the present disclosure to be used in applications such as nuclear reactors, electrochemical fuel cells, the production of silicon and polysilicon, etc.

Graphite articles may be fabricated by combining calcined petroleum coke and coal-tar pitch binder into a stock blend. In this multi-step process, the calcined petroleum coke is first crushed, sized and milled into a finely defined powder. Generally, particles up to about 25 millimeters (mm) in average diameter are employed in the blend. The particulate fraction preferably includes coke powder filler having a small particle size. Other additives that may be incorporated into the small particle size filler include iron oxides to inhibit puffing (caused by release of sulfur from its bond with carbon inside the coke particles), coke powder and oils or other lubricants to facilitate extrusion of the blend.

The stock blend is heated to the softening temperature of the pitch and is form pressed to create a "green" stock body such as a plate. For green body production, a continuously operating extruding press may be used to form a plate known as a "green" body. For graphite article production, the green body is formed by die extrusion or by molding in a forming mold to form a "green body."

The green stock body is heated in a furnace to carbonize the pitch so as to give the body permanency of form and higher mechanical strength. Depending upon the size of the graphite body and upon the specific manufacturer's process, this "baking" step requires the green body to be heat treated at a temperature of between about 700° C. and about 1100° C. To avoid oxidation, the green stock body is baked in the relative absence of air. The temperature of the body is raised at a constant rate to the final baking temperature. In some embodiments, the green stock body is maintained at the final baking temperature for between 1 week and 2 weeks, depending upon the size of the body.

After cooling and cleaning, the baked body may be impregnated one or more times with coal tar or petroleum pitch, or other types of pitches known in the industry, to deposit additional pitch coke in any open pores of the body. Each impregnation is then followed by an additional baking step, including cooling and cleaning. The time and temperature for each re-baking step may vary, depending upon the particular manufacturer's process. Additives may be incorporated into the pitch to improve specific properties of the graphite body. Each such densification step (i.e. each additional impregnation and re-baking cycle) generally increases the density of the stock material and provides for a higher mechanical strength. Typically, forming each body includes at least one densification step. Many such articles require several separate densification steps before the desired density is achieved.

After densification, the body, referred to at this stage as a carbonized body, is then graphitized. Graphitization involves heat treatment at a final temperature of at least about 2600° C., and generally (but not necessarily) up to about 3400° C., for a time sufficient to cause the carbon atoms in the calcined coke and pitch coke binder to transform from a poorly ordered state into the crystalline structure of graphite. At these high temperatures, elements other than carbon are volatilized and escape as vapors.

After graphitization is completed, the body can be cut to size and then machined or otherwise formed into its final configuration. Given its nature, graphite permits machining to a high degree of tolerance, thus permitting a strong connection between graphite plates or the like.

The lengthy densification cycles greatly increase the expense and time of manufacture of graphite bodies. For example, it may take about six months to form certain graphite articles, depending on the number of densification steps. Other graphite articles may take about 35 days to manufacture, again depending on the number of densification steps. More to the point, the graphite articles produced by this conventional processing do not have the high porosity, low permeability characteristics sought for certain applications.

BRIEF DESCRIPTION

The present disclosure provides a new and improved method of forming a carbon body, such as graphite plate or billet, which provides a graphite article having a unique combination of high porosity and low permeability.

Aspects of the present disclosure include a method of forming a carbon body, such as a graphite plate or billet, which results in the production of a graphite article having both high porosity and ultra-low permeability. The method includes combining a) a carbon material which can be coke particles, graphite particles or combinations thereof and b) a binder material such as pitch to form a stock mixture and heating the stock mixture to a sufficient temperature to carbonize at least a portion of the mixture so as to form a preform body. The method includes resistive heating by applying an electric current to the stock mixture such that heat is generated within the mixture. While heating the mixture, a pressure of at least about 35 kg/cm$^2$ is applied to the stock mixture to form an at least partially carbonized stock mixture. The at least partially carbonized stock mixture is then graphitized.

In accordance with an aspect of the present disclosure, the method provides a significant reduction in the process time required to carbonize a stock mixture. Exemplary preform process times include a process time of anywhere from about 10 minutes up to about 120 minutes for a 20-25 kilogram (kg) carbon body. In specific instances, the processing time may be up to about 50 minutes, up to about 60 minutes, up to about 70 minutes, and even up to about 90 minutes.

In accordance with another aspect of the present disclosure, the hot pressing step provides for use of high melting point pitch as the binder material of the stock mixture. High melting point pitch accords a significant increase in the obtainable coking yield of the pitch component during carbonization as compared to previously known methods. One embodiment of the method of this disclosure provides a coking yield of up to about 80% as compared to a typical coking yield of about 60% or lower.

In accordance with yet another aspect of the present disclosure, the method provides a preform body having gross dimensions sufficiently approximate to the desired machined dimensions of the final graphitized carbon body so as to provide a significant increase in the obtainable material yield, i.e. the amount of the graphitized mass remaining after machining, as compared to previously known methods.

In accordance with still another aspect of the present disclosure, the hot pressing step provides that compressive molding pressure is applied perpendicularly to the longitudinal axis of the preform formed within the hot press mold so as to result in a preform having longitudinally preferred orientation.

Thus, graphite articles produced in accordance with the disclosed method exhibit the combination of high porosity, by which is meant a porosity of at least about 10%, more preferably at least about 12.5%, and ultra-low permeability, by which is meant a permeability of no greater than about 1.0 milli-darcys, more preferably less than about 0.9 milli-darcys, and most preferably less than about 0.75 milli-darcys, as measured by ASTM C577. In addition, at least about 60%, more preferably at least about 80%, of the pores of the graphite article are no greater than about 40 microns, more preferably no greater than about 30 microns. This makes the resulting graphite article suitable for use in applications such as nuclear reactors, electrochemical fuel cells, the production of silicon and polysilicon, etc.

DETAILED DESCRIPTION OF THE PREFERRED EMBODIMENTS

A method of forming a graphite article for use in applications such as nuclear reactors, electrochemical fuel cells, silicon and polysilicon production, etc., employs resistance heating of a stock blend of a carbon material which can be coke particles, graphite particles or combinations thereof, and a binder material such as pitch. Preferably, the stock blend includes raw coke, high melting point pitch and carbon fibers derived from pitch. Optionally, the stock blend may also include calcinated coke, graphite, carbon fibers, coal tar pitch, petroleum pitch, or coking additives such as sulfur. As desired, additives may be added to improve the processing characteristics of the blend or to improve the physical characteristics of the graphite article. Such additives may be added during mixing or after forming the stock blend. During the hot pressing step, resistance heating is accompanied by application of mechanical pressure ("hot-pressing") to increase the density and carbonization of the blend. The resulting carbonized body or "preform" is preferably subjected to graphitization after hot-pressing by heating the preform to a final temperature of between about 2600° C. to about 3400° C. or higher to remove remaining non-carbon components and form a material which is almost exclusively graphite. In certain embodiments, the graphitization is at a temperature of at least about 2800° C., and up to about 3200° C. Optionally, after hot-pressing, the preform body may be subjected to one or more densification steps employing a carbonizable pitch to further increase the density of the preform prior to the graphitization step.

Figure 1:
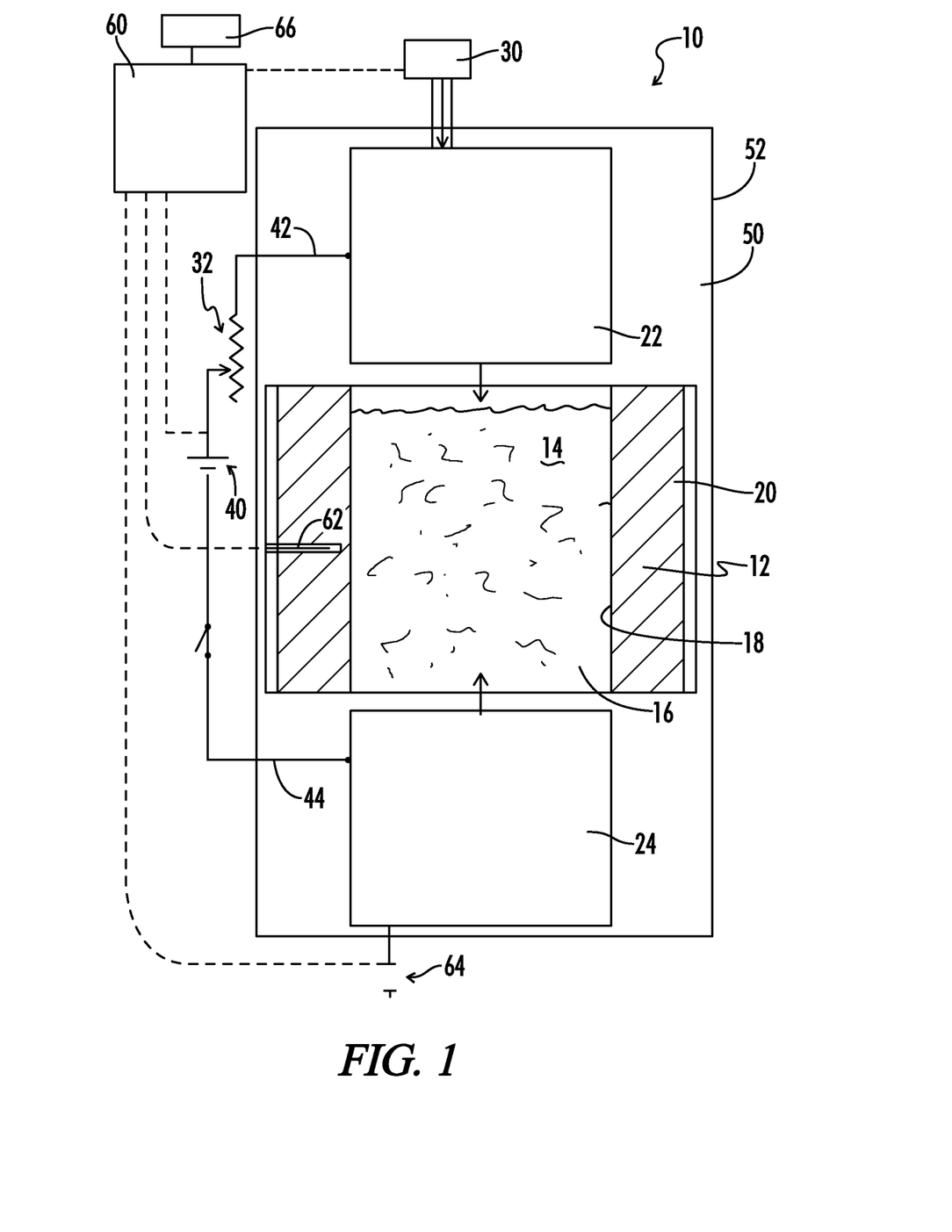
FIG. 1 is a diagram of a hot press apparatus suitable for use in the method of the present disclosure.

An exemplary hot press 10 suited to resistively heating and compressing the mixture is shown in FIG. 1. The hot press includes a mold box 12, which defines a rectangular cavity 14, shaped to receive the mixture 16 of coke particles and/or graphite particles and binder material. The cavity is surrounded on four sides 18 by a block or panels 20 of an insulation material, such as a refractory material, which is both electrically and thermally insulative. Pressure is applied to the mixture by upper and lower pistons 22, 24, which are pushed toward each other by application of a compressive force to one or both of the pistons. It will be appreciated that the compressive force may alternatively or additionally be applied from opposed sides 18 of the mixture. Alternatively, pressure may only be applied by one of pistons 22 or 24. In the case that pressure is applied by only one piston, the press may be referred to as a single-action ram. The press illustrated in FIG. 1 may be referred to as a dual action ram for at least the reason that pressure is applied from two pistons 22, 24.

A hydraulic system 30, or other suitable system for applying pressure to the piston(s) 22, 24 urges the pistons together. A resistive heating system 32 applies a current to the mixture. The resistive heating system includes first and second electrodes, which are in electrical contact with the mixture. In a preferred embodiment, the pistons 22, 24 also serve as electrically conductive members, i.e., as the first and second electrodes, respectively, and are formed from an electrically conductive material, such as steel. In an alternative embodiment, the electrodes are separate elements, which may apply the current from the same direction as the pistons 22, 24, or from a different direction (e.g., through the sides 18 of the hot press).

The resistive heating system 32 includes a source of electrical power for providing a high current at low voltage, such as an AC supply 40. High DC currents are also contemplated. The AC or DC supply is electrically connected with the electrodes 22, 24 by suitable electrical wiring 42, 44. The mixture is sufficiently conductive to allow current to flow through the mixture and complete an electrical circuit with the first electrode 22 and second electrode 24 and power source 40, while having sufficient electrical resistance to generate heat within the mixture 16 as the current flows between the electrodes 22, 24. In one embodiment, the heating rate is preferably at least 100° C./min and can be as high as about 1000° C./min, or higher. In another embodiment, the heating rate may be up to about 100° C./min. In the case of certain mix designs, resistance heating may rapidly heat the entire mixture 16 to a suitable temperature for removal of volatile materials and carbonization of the binder, typically in a matter of a few seconds or minutes, creating voids or bubbles within the mixture. Mechanical pressure is applied to densify the mixture 16 as the applied heat drives off the volatile materials.

The hot press 10 is preferably contained within a chamber 50 of a thermally insulative housing 52. An exhaust system (not shown) optionally removes volatile gases from the chamber 50.

The construction of the hot press 10 is such that all parts of the mixture 16 within the cavity 14 are subjected to a uniform pressure and to a uniform current flow. This results in the product having substantially uniform characteristics throughout the mass and which is substantially free of fissures and other irregularities, which tend to result in fracture during use.

In a preferred embodiment, the ends of the hot press molds are stainless steel end plates, which are in electrical contact with the hot press mixture. A resistive heating system applies an electrical current to the hot press mixture through these end plates. In a more preferred embodiment, the pistons and the hot press mold each have a silicon carbide surface liner and are both electrically insulated from the frame of the hydraulic hot press assembly. The resistive heating system includes a source of electrical power for providing a high current at low voltage, such as a DC supply. High AC currents are also contemplated. The DC or AC supply is electrically connected with the stainless steel end plates. The construction of the hydraulic hot press assembly is such that all parts of the hot press mixture within the hot press mold cavity are subjected to a substantially uniform current flow. Resistively heating and compressively molding the hot press mixture under current and pressure conditions that are generally uniform throughout the hot press mixture results in substantially uniform characteristics throughout the preform plate and further results in a significant reduction in fissures and other irregularities, which tend to result in fracture during use. Preferably, a programmed application of the current and pressure provides, among other things, hot press mixture temperatures, pressures, heating rates and pressurization rates in accordance with a desired baking process, the calculations of which are based upon specific stock kinetics. More preferably, a programmable control system integral to the hydraulic hot press assembly provides such a programmed application of current and pressure.

The hot press mold cavity may be configured to produce a preform cast so as to closely approximate the dimensions of a finished carbon body, such as a graphite plate, thereby reducing the need for subsequent machining to form a desired component part. For plate production, or for other article shapes, the preform molded shape may be cast with sufficient dimensional precision as to allow for up to 80% material yield upon machining to final dimensions, as compared to typical material yield, which can be about 60% or lower.

A control system 60 monitors the current applied to the mixture 16 and other parameters of the system. For example, the temperature of the mixture 16 is measured with a thermocouple 62, or other temperature monitoring device, mounted through the block 20 of the hot press or in a passage in thermal contact therewith. Displacement of the pistons 22, 24 relative to each other is detected with a displacement detector 64 from which estimates of the mixture density can be made. The control system 60 receives signals from the thermocouple 62 and displacement detector 64, corresponding to the temperature and linear displacement, respectively, and measurements of electrical current, voltage across the material from the current source 40, and hydraulic pressure from the hydraulic system 30. A processor 66 associated with the controller 60 compares the detected measurements with a preprogrammed set of desired values and instructs the control system to adjust certain parameters, such as the applied current, voltage, and/or hydraulic pressure, to achieve a product with the desired characteristics in terms of density, composition, and so forth.

Figure 2:
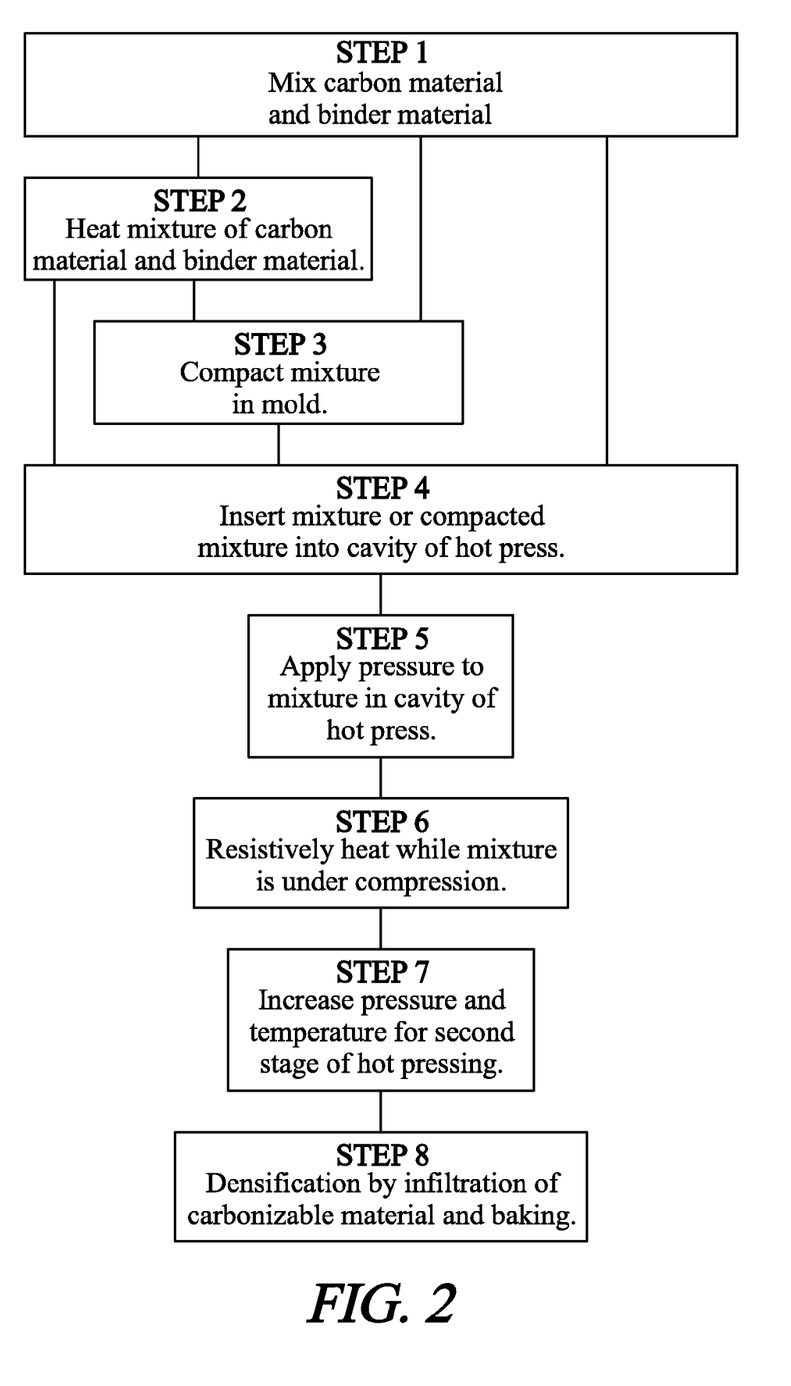
FIG. 2 is a flow chart showing steps of an exemplary process scheme for forming a graphite article according to the present disclosure.

With reference to FIG. 2, a flow chart representing the sequence of steps involved in an exemplary embodiment of the manufacture of a graphite article is shown.

In Step 1, a carbon material, preferably including coke or graphite particles, is combined with a binder material. The particles are advantageously fine particles, by which is meant that at least about 25%, more particularly at least about 35%, even at least about 50% or at least about 70% of the coke or graphite particles have a maximum grain size of less than about 100 microns, preferably less than about 85 microns, and even more preferably less than about 75 microns. In some embodiments, the maximum grain size is less than about 50 microns. The grain size of the particles may be measured by any known particle size analyzer. One example of such a device is available from MicroTrac Inc. of Montgomeryville, Pa.

In certain advantageous embodiments, a significant fraction of the carbon material, i.e., at least about 30%, comprises particles which are more compressible than coke ("Compressible Particles"). In yet another embodiment, at least about 65% of the carbon material are Compressible Particles; in still another embodiment, Compressible Particles make up 100% of the carbon material. One method to determine if a particle is more compressible than coke (and is, therefore, a Compressible Particle) is to compare the spring back ratio of the particle to be tested to that of a coke particle. Alternatively, a plurality of particles to be tested and coke particles can be subjected to a compressive pressure under the same conditions; if the particles to be tested exhibit a higher spring back ratio than the coke particles when the pressure is released, the particles to be tested are more compressible than the coke particles and are Compressible Particles.

In yet another embodiment, the compressibility of particles may be described in terms of a volume change of mass of the particles at two given pressures. Preferably, the volume change is measured on two lots of particles being compared, each having a similar particle range. In one example, a lot of BO particles and a lot of coke particles are compressed. Each lot of particles is initially compressed at 200 psi and subsequently compressed at a pressure of 1000 psi. A formula that may be used to determine the volume change of the particles is: $\Delta V/V_0 \times 100\%$. $\Delta V$ is $V_1$ minus $V_0$, wherein $V_1$ is the volume of the mass of the lot of particles at 1000 psi and $V_0$ is the volume of the mass of the lot of particles at 200 psi. In the example provided above, the masses of BO particles experience a volume change of about 27% to 31% and the coke particles experience a volume change of about 18%. Thus, the BO particles are Compressible Particles.

In a further embodiment, the Compressible Particles are in the form of flour, which may be defined as a distribution of particles of which at least 45% of the particles pass through a 200 U.S. mesh screen. More preferably, at least 55% of the particles pass through a 200 U.S. mesh screen. Even more preferred is a rang eof particles where at least about 90% pass through a 200 U.S. mesh screen.

In an embodiment of the disclosure, the Compressible Particles comprise graphite particles. Furthermore, the graphite particles useful in the process of the present disclosure includes particles produced by milling or machining graphite articles, including those produced in accordance with the method disclosed herein as well as conventionally produced graphite articles. Indeed, during the machining of a graphite article, the particles produced by the machining operation are often viewed as waste materials. In this way, what was formerly a waste stream can be advantageously used. In addition to the above, the graphite particles may be recycled graphite particles irrespective of how the particles are reclaimed.

In one preferred embodiment, at least 70% of the graphite particles have an average diameter of less than about 75 microns; in another preferred embodiment, at least 85% of the graphite particles have an average diameter of less than about 75 microns.

The binder material acts as a binder and a filler to fill gaps between the particles. Preferably, the mixture 16 includes about 20-80% by weight of carbon material and about 20-50% of the binder material, more preferably, less than about 40% of the binder material by weight. Other carbonizable and carbonaceous additives may be incorporated into the mixture. For example, a carbon material, which is electrically more conductive than the coke particles or binder material, such as powdered graphitized carbon, may be added to the mixture to increase the conductivity of the mixture if the resistance is too high for adequate current to flow during resistive heating.

The binder material provides an independent source of carbon upon pyrolytic decomposition. The binder material is fusible (i.e., capable of melting) and contains both volatile and non-volatile components. The binder material decomposes on heating to form an infusible material which is primarily carbon with the release of volatiles. Binder materials which may be used to form graphite articles include liquids and solids which become sufficiently liquid or have low enough viscosity upon melting to coat the other constituents. Preferred binder materials are finely comminuted solids. However the disclosure is not limited to the use of finely comminuted solids, non-finely comminuted solids may also be used to practice the disclosure. Exemplary binder materials include pitch, sugar, furan resins, and phenolic resins. Powdered pitch is a particularly preferred binder material. Mesophase pitches and isotropic pitches with carbon yields of 60% or higher, more preferably, 70% or higher upon coking are particularly preferred as binder materials. These pitches are produced from petroleum or coal tar, although it is also contemplated that the pitch binder material may be synthetically formed. Pitch/sulfur mixtures are also suitable as binder materials. While the binder material is described with particular reference to milled pitch powder, it will be appreciated that other binder materials are also contemplated. However, for binder materials with lower carbon content, such as phenolic resins, it has been found that the quantity of volatile components which are released during hot pressing is less preferred when forming a product of high density.

The pitch or other binder material is preferably in the form of a powder or other finely divided material having an average particle size of less than about 1000 microns, more preferably, less than 100 microns. The desired particle size can be achieved by milling or other comminution process. Exemplary pitch materials include coal tar pitches, available from Rutgers VFT AG, Reilly Industries, Inc., and Koppers Industries, Inc.

Advantageously, the binder material, especially if pitch, if a high Mettler softening point material, since high softening point materials, like high softening point pitch, has lower volatiles and a higher coking value, which results in lower emissions and more solids (and, thus, fewer voids and lower porosity), as compared to pitch having lower softening point materials. Preferably, the softening point of the binder material is at least about 190° C., more preferably at least about 210° C.

The binder material and carbon material may be "dry mixed," i.e., mixed without addition of solvents and at a temperature at which the binder material is still a solid. More preferably, heat is applied during the mixing phase to raise the temperature of the binder material above its softening point, which is about 70-350° C., and is preferably at least about 190° C., in the case of pitch (Step 2). Preferably, the mixture is heated to about 30° C. or more above the Mettler softening point of the binder material to reduce the viscosity of the binder material. A Sigma-type mixer or similar is preferably used to ensure the fibers and pitch are intimately blended. A blending time of about 10-30 minutes is generally sufficient.

While the process is preferably carried out in the absence of additional liquids, such as water or an organic solvent, it is also contemplated that a small amount of an organic solvent may be mixed with the binder and reinforcement materials to act as a plasticizer for the binder material and reduce the mixing temperature. Other methods, which involve forming a slurry with a volatile liquid and drying the slurry to form a preform, may also be used.

With continued reference to FIG. 2, in Step 3, the mixture of carbon material and binder material is optionally packed into a separate mold from the mold box 12 of the hot press and pressed into a preform having a density of about 0.5-1.0 g/cm$^3$ and dimensions only slightly smaller than those of the mold cavity.

In Step 4, the preform of carbon material and binder material is transferred to the cavity 14 of the hot press mold box 12 (FIG. 1). In an alternative embodiment, Step 3, and/or Step 2, is eliminated and the mixture of carbon material and binder material is transferred directly to the mold box 12 from the mixer. The lower piston/electrode 24 is raised to a position in which it forms a base of the mold cavity 14 prior to introduction of the mixture/preform 16.

In Step 5, pressure is applied to compress the mixture 16. The pressure applied is partly dependent on the desired final density of the composite material. In general, a pressure of at least about 35 kg/cm$^2$ is applied. The applied pressure can be up to about 150 kg/cm$^2$, or higher.

In Step 6, the mixture 16 is resistively heated while continuing to apply pressure to the mixture. It is also contemplated that heating may commence concurrently with, or before the start of application of pressure. Preferably, both heating and application of pressure are carried out concurrently, for at least a part of the process time, to densify the material as the volatile materials are given off.

The temperature of the mixture 16 during resistive heating is preferably sufficient to melt the binder material, and optionally remove at least some of the volatiles from the binder material, and facilitate compression of the binder mixture as the pitch material is rigidized. It should be appreciated that, since pitch is generally not a homogeneous material, a portion of a pitch binder material may remain unmelted (for example, quinoline insoluble solids tend not to melt), even at temperatures significantly above the softening point. Additionally, while substantially all the volatiles are removed in this step, it is also contemplated that a portion of the volatiles may remain without unduly affecting the properties of the material.

The mixture preferably reaches a temperature above the carbonization temperature, which is about 500° C. in the case of pitch binder material. For example, the mixture is heated to at least about 700° C., more preferably, about 800-900° C., although higher temperatures are also contemplated. The power input applied during resistive heating depends on the resistance of the mix and the desired temperature. For a mixture of pitch and carbon fibers, a power input of up to about 60 kW/kg is applied, preferably in the range of 45-60 kW/kg, for at least part of the heating process. For example, a power input of about 45-60 kW/kg is applied for 90 seconds to 2 minutes, which may be preceded by application of pressure alone for about 3 to 5 minutes.

In another embodiment, a two-stage process is used. In a first stage (Step 6), a relatively low power input, preferably in the range of about 30 kW/kg is applied for a period of about 30 seconds. In this stage, the temperature is preferably in the range of about 300° C. to 500° C. The bulk of the volatiles are removed from the mixture in this temperature range. Above a certain temperature, about 500° C. in the case of pitch binder material, the pitch becomes rigid (carbonizes) and it is more difficult to remove the volatiles from the mixture without disruption of the structure. Accordingly, in the first stage, the temperature is preferably kept below the curing temperature of the binder material.

In the second stage (Step 7), the temperature is increased to a higher temperature (e.g., above about 700° C., more preferably, 800-900° C.), sufficient to carbonize the binder material. In this stage, the power input may be from about 45 kW/kg to about 60 kW/kg to bring the temperature up to about 800-900° C. The power is maintained at this level for about 1-2 minutes, or longer. The optimum time depends on the applied power input, resistance, and other factors.

The first and second stages are preferably also associated with different applied pressures. In the first stage (Step 6), for example, the pressure is lower than in the second stage (Step 7). The lower pressure reduces the opportunity for volatile gases to be trapped in the mixture, causing violent disruption of the mixture as they escape. For example, a pressure of about 35-70 kg/cm$^2$ is employed for the first stage, while an increased pressure of about 100-150 kg/cm$^2$ is employed for the second stage.

The resistance heating/pressing step (Step 6 and/or Step 7) takes under three hours, preferably, about 30 minutes or less, more preferably, less than about ten minutes, most preferably about 5-8 minutes, which is a much shorter time than the days required in conventional heating/pressing systems. Additionally, the density of the composite formed in this step is preferably at least 1.3 g/cm$^3$, more preferably, at least 1.4 g/cm$^3$, most preferably, about 1.5 to 1.85 g/cm$^3$.

This is much higher than the density generally achieved in conventional methods, where the density of the fiber/binder composite is about 0.6-1.3 g/cm$^3$ without further densification procedures. As a consequence, fewer infiltration cycles, or, in some instances, no infiltration steps (Step 8) are used to achieve a final desired density (generally 1.7-1.9 g/cm$^3$, more preferably 1.75-1.85 g/cm$^3$) with the resistive heating method as compared to conventional hot pressing methods. This decreases the number of processing steps and reduces the overall processing time even further. For example, where six or more infiltration steps are commonly used in a conventional process, the present process accomplishes a final density of about 1.5-1.85 g/cm$^3$ without infiltration steps. Whereas the conventional method may take several months from start to finished product, the present resistive heating method reduces the time to a matter of days or hours.

In one preferred example, the graphite article has a density of less than about 1.9 g/cm$^3$, more preferably less than about 1.85 g/cm$^3$. Another advantageous property of the graphite article of the present disclosure is an electrical resistivity of less than about 7.0 µΩm. The article may have a flexural strength of greater than 3000 psi, more preferably greater than 3500 psi (flexural strength may be determined by a 4-point bending test). The graphite article may have a coefficient of thermal expansion (CTE) of less than about $2.0 \times 10^{-6}/°$ C. in the with-grain direction, more preferably less than about $1.5 \times 10^{-6}/°$ C. in the with-grain direction.

In the present disclosure, the porosity and permeability of the preform body formed in the hot pressing step are superior in combination than that achieved in conventional methods. As a consequence, graphite articles exhibiting the combination of high porosity, by which is meant a porosity of at least about 10%, more preferably at least about 12.5%, and ultra-low permeability, by which is meant a permeability of no greater than about 1.0 milli-darcys, more preferably less than about 0.9 milli-darcys, and most preferably less than about 0.75 milli-darcys, as measured by ASTM C577. In addition, at least about 60%, more preferably at least about 80% of the pores of the graphite article produced by the method of the present disclosure are no greater than about 50 microns, more preferably no greater than about 40 microns, and, in the most preferred embodiments, no greater than about 30 microns. This makes the inventive graphite article suitable for use in applications such as nuclear reactors, electrochemical fuel cells, the production of silicon and polysilicon, etc.

Figure 3:
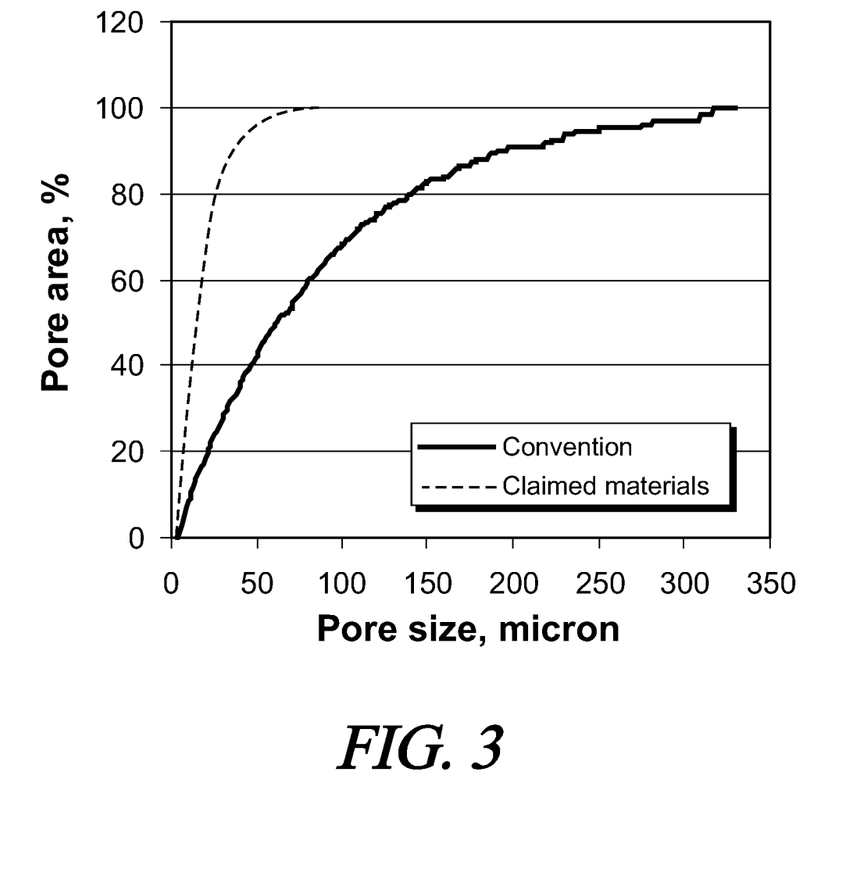
FIG. 3 is a graph of the pore size versus pore area of materials prepared according to the method detailed herein as compared to conventionally processed materials.
Figure 4A:
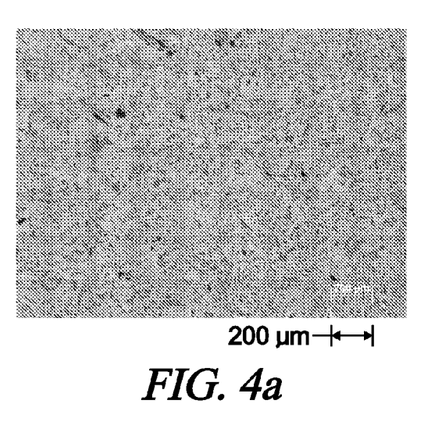
FIG. 4a is a high magnification photomicrograph of a cross-section of material prepared according to the method detailed herein.
Figure 4B:
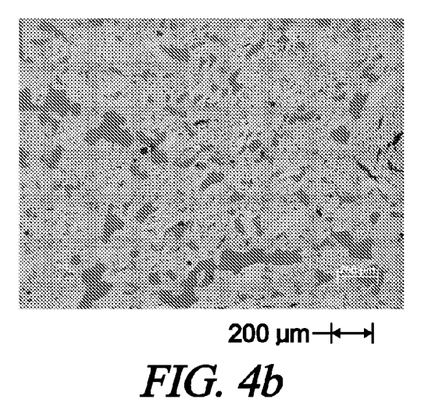
FIG. 4b is a high magnification photomicrograph of a cross-section of conventionally-processed material.
Figure 5A:
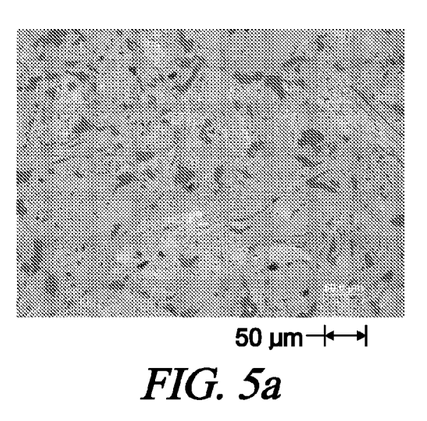
FIG. 5a is a lower magnification (as compared with FIG. 4a) photomicrograph of a cross-section of material prepared according to the method detailed herein.
Figure 5B:
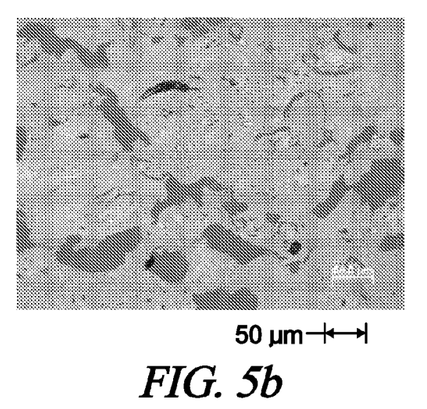
FIG. 5b is a lower magnification (as compared with FIG. 4b) photomicrograph of a cross-section of conventionally-processed material.

This is demonstrated by the graph of FIG. 3, the use of the method disclosed herein provides a material such that, as the pore area increases, the pore size does not increase to the same extent as seen in conventionally processes materials. For instance, with a pore area of about 90%, pores of below about 40 microns are primarily present; as a comparison, in the conventional process materials, with a pore area of about 90%, pores of over 200 microns are primarily present. This can be visually observed by viewing the photomicrographs of graphite articles produced in accordance with the method of this disclosure (FIGS. 4a and 5a), as compared to corresponding photomicrographs taken of conventionally-processed materials (FIGS. 4b and 5b).

Thus, although the present disclosure has been described with reference to the preferred embodiment of a new and useful high porosity/ultra-low permeability graphite body, and process for the production thereof, it is not intended that such references be construed as limitations upon the scope of this disclosure except as set forth in the appended claims. Modifications and alterations will occur to others upon reading and understanding the preceding detailed description. It is intended that the disclosure be construed as including all such modifications and alterations insofar as they come within the scope of the appended claims or the equivalents thereof. Additionally, the described embodiments may be practiced in any combination thereof.

What is claimed is:

1. A graphite article having a porosity of at least about 10% and a permeability of no greater than about 1.0 millidarcys and an electrical resistivity of less than about 7.0 µΩm.

2. The graphite article of claim 1, having a porosity of at least about 12.5%.

3. The graphite article of claim 1, having a permeability of less than about 0.75 millidarcys.

4. The graphite article of claim 1, wherein at least about 60% of the pores of the graphite article are no greater than about 40 microns.

5. The graphite article of claim 4, wherein at least about 60% of the pores of the graphite article are no greater than about 30 microns.

6. The graphite article of claim 1 having a flexural strength of greater than 3000 psi.

7. The graphite article of claim 6 having a flexural strength of greater than 3500 psi.

8. The graphite article of claim 1 having a coefficient of thermal expansion (CTE) of less than about $2.0 \times 10^{-6}/°$ C. in a with-grain direction.

9. The graphite article of claim 8 having a coefficient of thermal expansion (CTE) of less than about $1.5 \times 10^{-6}/°C$. in a with-grain direction.

* * * * *